United States Patent
Okayasu

(10) Patent No.: US 8,175,657 B2
(45) Date of Patent: May 8, 2012

(54) IN-VEHICLE APPARATUS WITH HANDSFREE FUNCTION

(75) Inventor: Takafumi Okayasu, Kariya (JP)

(73) Assignee: Denso Corporation, Kariya (JP)

( * ) Notice: Subject to any disclaimer, the term of this patent is extended or adjusted under 35 U.S.C. 154(b) by 185 days.

(21) Appl. No.: 12/658,468

(22) Filed: Feb. 9, 2010

(65) Prior Publication Data

US 2010/0210316 A1    Aug. 19, 2010

(30) Foreign Application Priority Data

Feb. 13, 2009    (JP) .................................. 2009-031233

(51) Int. Cl.
*H04M 1/00* (2006.01)
*H04B 7/00* (2006.01)

(52) U.S. Cl. .................. 455/569.2; 455/41.1; 455/41.2; 455/41.3

(58) Field of Classification Search ............... 455/569.2, 455/41.1, 41.2, 41.3
See application file for complete search history.

(56) References Cited

U.S. PATENT DOCUMENTS

| | | | |
|---|---|---|---|
| 2006/0079182 A1* | 4/2006 | Matsuda | 455/41.2 |
| 2008/0085745 A1 | 4/2008 | Ozaki | |
| 2008/0102821 A1* | 5/2008 | Jalon | 455/425 |
| 2008/0280655 A1 | 11/2008 | Ozaki | |
| 2009/0011799 A1* | 1/2009 | Douthitt et al. | 455/569.1 |
| 2009/0280746 A1* | 11/2009 | Sykora et al. | 455/41.3 |

FOREIGN PATENT DOCUMENTS

| | | |
|---|---|---|
| JP | 2002-223288 | 8/2002 |
| JP | 2005-210181 | 8/2005 |
| JP | 2008-98767 | 4/2008 |
| JP | 2008-278172 | 11/2008 |
| WO | WO 2009/060612 | 5/2009 |

OTHER PUBLICATIONS

Office action dated Oct. 26, 2010 in corresponding Japanese Application No. 2009-031233.

* cited by examiner

*Primary Examiner* — Wen Huang
(74) *Attorney, Agent, or Firm* — Harness, Dickey & Pierce, PLC

(57) ABSTRACT

When an in-vehicle handsfree apparatus establishes concurrent connection with a cellular phone via a Bluetooth interface device with respect to a phone book access profile (PBAP) for realizing a phone book data transfer as well as a handsfree profile (HFP) for realizing a handsfree phone call and a message access profile (MAP) for realizing a mail transfer, the in-vehicle apparatus is configured to start a connection process of PBAP without inserting the connection process of MAP, after the completing of the connection process of HFP.

4 Claims, 4 Drawing Sheets

IN-VEHICLE APPARATUS WITH HANDSFREE FUNCTION

CROSS REFERENCE TO RELATED APPLICATION

The present application is based on and incorporates herein by reference Japanese Patent Application No. 2009-312233 filed on Feb. 13, 2009.

FIELD OF THE INVENTION

The present invention relates to an in-vehicle apparatus having a handsfree function and capable of a concurrent connection with a cellular phone with respect to a handsfree phone call protocol for realizing a handsfree phone call with the cellular phone and a phone book data transfer protocol for realizing transfer of phone book data from the cellular phone to the in-vehicle apparatus.

BACKGROUND OF THE INVENTION

[Patent Document 1] JP 2002-223288 A

A main application of a cellular phone, which is brought into a vehicle or a vehicle compartment, is a handsfree phone call. There is a case that a cellular phone having Bluetooth (registered trademark, referred to as BT) communications function is brought into a compartment of a vehicle equipped with an in-vehicle apparatus which also has the Bluetooth communications function. In such cases, a handsfree profile (referred to as HFP) is connected for achieving a handsfree call, which is defined as an electronic communications standard of BT between in-vehicle apparatuses and cellular phones. For example, the foregoing configuration is disclosed in Patent document 1.

A cellular phone has a function to register phone book data. There is a phone book access profile (PBAP) as a profile for realizing transfer of the phone book data registered into the cellular phone to the in-vehicle apparatus. While focusing attention on the functions of HFP and PBAP, the applicant has been studying a configuration to carry out concurrent connection (so-called multiple connection) with respect to HFP and PBAP between an in-vehicle apparatus and a cellular phone.

When PBAP is connected between the in-vehicle apparatus and the cellular phone, the connection process of PBAP is started to automatically transmit the newest phone book data registered in the cellular phone to the in-vehicle apparatus. There may a state that an incoming call arrives at the cellular phone under the condition where HFP has been connected completely whereas PBAP has not been connected completely between the cellular phone and the in-vehicle apparatus. Such a state causes the following issue. That is, in the cellular phone, the registration name (for example, personal name etc.) corresponding to the phone number of the incoming call is obtained by referring to the phone book data and the obtained registration name is displayed. In contrast, the in-vehicle apparatus does not have the newest phone book data; thus, the registration name registered in the cellular phone is not displayed, and only the phone number of the incoming call is displayed in the in-vehicle apparatus.

The BT communications standard also defines a message access profile (MAP) for realizing a mail transfer, and an audio video profile (AVP) for realizing an audio data transfer. The concurrent connection between the cellular phone and in-vehicle apparatus can be possible with respect to MAP and AVP as well as HFP and PBAP. In connecting the multiple profiles in order one by one, a duration from the completion of the connection process of HFP to the completion of the connection process of PBAP may become long, thereby possibly causing the above issue and degrading the convenience.

SUMMARY OF THE INVENTION

The present invention is made in view of the above-mentioned situation. It is an object of the present invention to provide an in-vehicle apparatus having a handsfree function and capable of a concurrent connection with a cellular phone with respect to a handsfree phone call protocol for realizing a handsfree phone call and a phone book data transfer protocol for realizing transfer of phone book data from the cellular phone to the in-vehicle apparatus. According to the in-vehicle apparatus, in establishing the concurrent connection with the cellular phone, the newest phone book data registered in the cellular phone can be appropriately reflected on the in-vehicle handsfree apparatus, thereby improving the user's convenience and operability.

To achieve the above object, according to an example of the present invention, an in-vehicle apparatus having a handsfree function for a vehicle is provided as follows. Several communications protocols are connected simultaneously with a cellular phone to establish concurrent connection. The several communications protocols include at least a handsfree phone call protocol for realizing a handsfree phone call and a phone book data transfer protocol for realizing transfer of phone book data from the cellular phone to the in-vehicle apparatus. Connection and disconnection of a communications protocol is controlled between the connecting means and the cellular phone. Herein, a connection process of the phone book data transfer protocol is started, without inserting a connection process of an other communications protocol except the phone book data transfer protocol, after completing a connection process of the handsfree phone call protocol, when the concurrent connection with the cellular phone is established with respect to the several communications protocols at least including the handsfree phone call protocol and the phone book data transfer protocol.

Such a configuration can thereby shorten as much as possible a duration from when a connection process of the handsfree phone call protocol is completed to when a connection process of the phone book data transfer protocol is started. The newest phone book data registered in the cellular phone can be thereby appropriately reflected on the in-vehicle handsfree apparatus, thereby improving the user's operability.

As another example of the present invention, a method is provided for connecting several communications protocols to establish a concurrent connection with a cellular phone by an in-vehicle apparatus. The several communications protocols include a handsfree phone call protocol for realizing a handsfree phone call and a phone book data transfer protocol for realizing transfer of phone book data from the cellular phone to the in-vehicle apparatus. The method comprises: (i) starting a connection process of the handsfree phone call protocol at first when establishing the concurrent connection between the in-vehicle apparatus and the cellular phone with respect to the several communications protocols at least including the handsfree phone call protocol and the phone book transfer protocol; (ii) determining whether the connection process of the handsfree phone call with the cellular phone is completed; and (iii) starting a connection process of the phone book data transfer protocol immediately after determining that the connection process of the handsfree phone call protocol is completed, without inserting a connection process of an other communications protocol except the phone book data transfer protocol.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
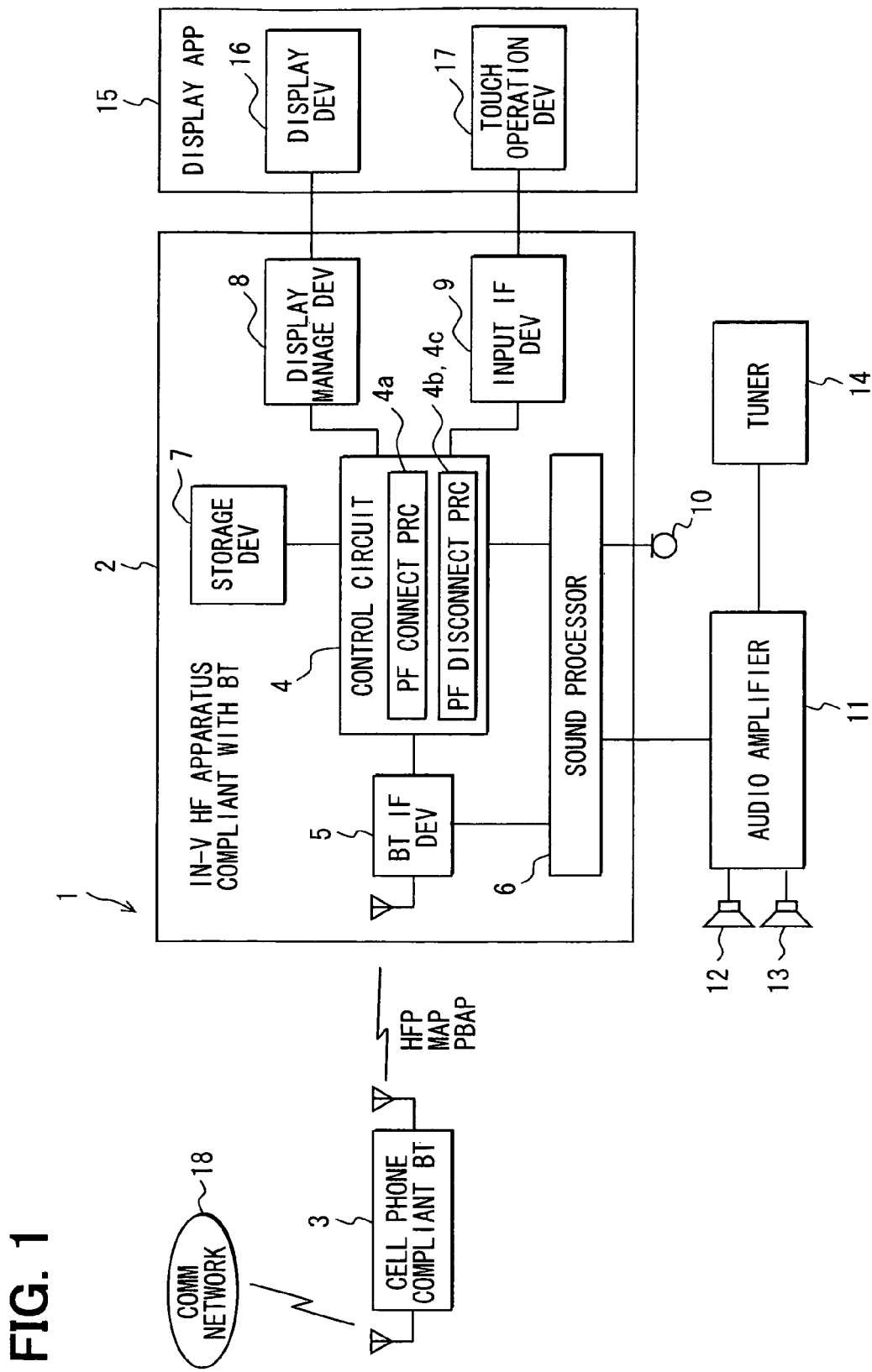
FIG. 1 is a functional block diagram according to an embodiment of the present invention.

An embodiment according to the present invention will be explained with reference to drawings. First, a "Bluetooth" is a trade mark and referred to as BT. An in-vehicle handsfree apparatus having a BT communications function (also referred to as BT-compliant) is mounted in a subject vehicle. The following explains a case that a cellular phone also having the BT communications function is brought into a passenger compartment of the subject vehicle and becomes able to communicate with the in-vehicle BT-compliant handsfree apparatus.

The in-vehicle handsfree apparatus 2 and the cellular phone 3 are included in an in-vehicle handsfree system 1. An in-vehicle handsfree apparatus 2 according to an embodiment of the present invention is mounted in the subject vehicle and includes a control circuit 4, a BT interface (IF) device 5 functioning as a connecting means or device, a call sound processor 6, a storage device 7, a display management device 8, and a touch operation input interface device 9.

The control circuit 4 includes a known micro-computer having a CPU, RAM, ROM, I/O bus, etc., and controls an overall operation of the in-vehicle handsfree apparatus 2 such as a communications operation, and a data management operation. The BT interface device 5 has a function to execute a BT communications with the cellular phone 3. The BT interface device 5 is configured to be able to connect several communications protocols (or establish connection with respect to the following communications protocols) at the same time (so-called multiple connection or concurrent connection). Further, it is noted that "connection" naturally means "communications connection." The communications protocols taking place under the concurrent connection are as follows. Those are defined as communications standard of BT. A HandsFree Profile (HFP) (also referred to as a handsfree phone call protocol) is for realizing a handsfree (telephone) call; A Phone Book Access Profile (PBAP) (also referred to as a phone book data transfer protocol) is for realizing transfer of phone book data, outgoing call history data, or incoming call history data; and a Message Access Profile (MAP) (also referred to as a mail transfer protocol) is for realizing a mail transfer.

Further, it is noted that an electronic mail or a mail is defined in the present application as a general term for transmission such as a character (or text) message or image data exchanged in the known computer networks. Moreover, the BT interface device 5 is compliant with an Audio Video Profile (AVP) for realizing a transfer of musical or audio data, and an Object Push Profile (OPP) for realizing the various data transfers, in addition to the HFP, PBAP, and MAP. Herein, the above profiles signify communications protocols defined for every function.

The call sound processor 6 is connected with a microphone 10 and an audio amplifier 11. The microphone 10 is arranged at a position to easily collect user's utterance. The audio amplifier 11 is arranged outside of the in-vehicle handsfree apparatus 2 and connected with two speakers 12, 13. The speaker 12 and the speaker 13 are arranged symmetrically with respect to the full forth-and-back longitudinal direction of the vehicle mounted with the present in-vehicle handsfree apparatus 2. For example, the speaker 12 is arranged at the driver's seat door, while the speaker 13 is arranged at the front passenger door. In addition, the audio amplifier 11 is also connected to a tuner deck 14. For instance, the tuner deck 14 receives a musical tune sound from a storage medium for music, or a radio program from a radio station and outputs them to the audio amplifier 11. The audio amplifier 11 amplifies the received musical tune sound and the radio program and outputs the amplified sounds via the speakers 12, 13.

The storage device 7 stores the following various data, for example: phone book data indicating correspondence between telephone numbers and registration names; historical outgoing call data indicating correspondence between outgoing call clock times and destination phone numbers with respect to outgoing calls from the in-vehicle handsfree apparatus 2 or cellular phone 3 with which the HFP is connected; historical incoming call data indicating correspondence between incoming call clock times and source phone numbers with respect to incoming calls to the cellular phone 3 with which the in-vehicle handsfree apparatus 2 establishes the HFP connection.

A display apparatus 15 includes a display (screen) device 16 for displaying display windows, and a touch operation device (i.e., touch sensitive panel) 17 forming a touch switch on the display window. The display management device 8 manages or controls a display window operation of the display device 16 in the display apparatus 15 based on a display command notice (also referred to signal), which is received from the control circuit 4. The touch operation input interface device 9 receives an operation detection notice (also referred to as signal) via the touch operation device 17 according to the user having operated the touch switch presently formed on the display window. The touch operation input interface device 9 outputs the received operation detection notice to the control circuit 4. The control circuit 4 processes the received operation detection notice by analyzing it.

The cellular phone 3 includes the following: a control circuit to control an overall operation of the cellular phone 3; a telephone communications device to execute telephone communications with the telecommunications network 18; a BT interface (IF) device to execute BT communications; a key input device arranging the various keys which the user operates; a storage device to store the various data such as phone book data indicating correspondence between telephone numbers and registration names; and a display device to display the various display windows; a microphone to input a sound which the user utters; and a speaker which outputs as a reception sound a sound received from a call partner. Further, the BT interface device of the cellular phone 3 has a function to execute BT communications with the in-vehicle handsfree apparatus 2. Like the BT interface device 5 of the in-vehicle handsfree apparatus 2, the BT interface device of the cellular phone 3 is compliant with HFP, PBAP, and MAP and can establish a concurrent connection with respect to HFP, PBAP, and MAP with the in-vehicle handsfree apparatus 2.

When the in-vehicle handsfree apparatus 2 and the cellular phone 3 have connected the HFP with each other, an arrival of an incoming voice call at the cellular phone 3 from the communications network 18 occurs (i.e., a voice call comes to the cellular phone 3 via the communications network 18). In such cases, a ring tone of the arrival of the incoming voice call is outputted via the speakers 12, 13, and a voice call arrival window is displayed in the display device 16. The arrival of the incoming voice call is thus notified to the user via the in-vehicle handsfree apparatus 2. When the in-vehicle handsfree apparatus 2 and the cellular phone 3 are connecting the MAP with each other, an arrival of an incoming mail at the cellular phone 3 via the communications network 18 occurs (i.e., a mail arrives at or comes to the cellular phone 3 via the communications network 18). In such cases, a ring tone of the mail arrival is outputted via the speakers 12, 13, and a mail arrival window is displayed in the display section 16. The mail arrival is thus notified to the user via the in-vehicle handsfree apparatus 2.

Figure 2:
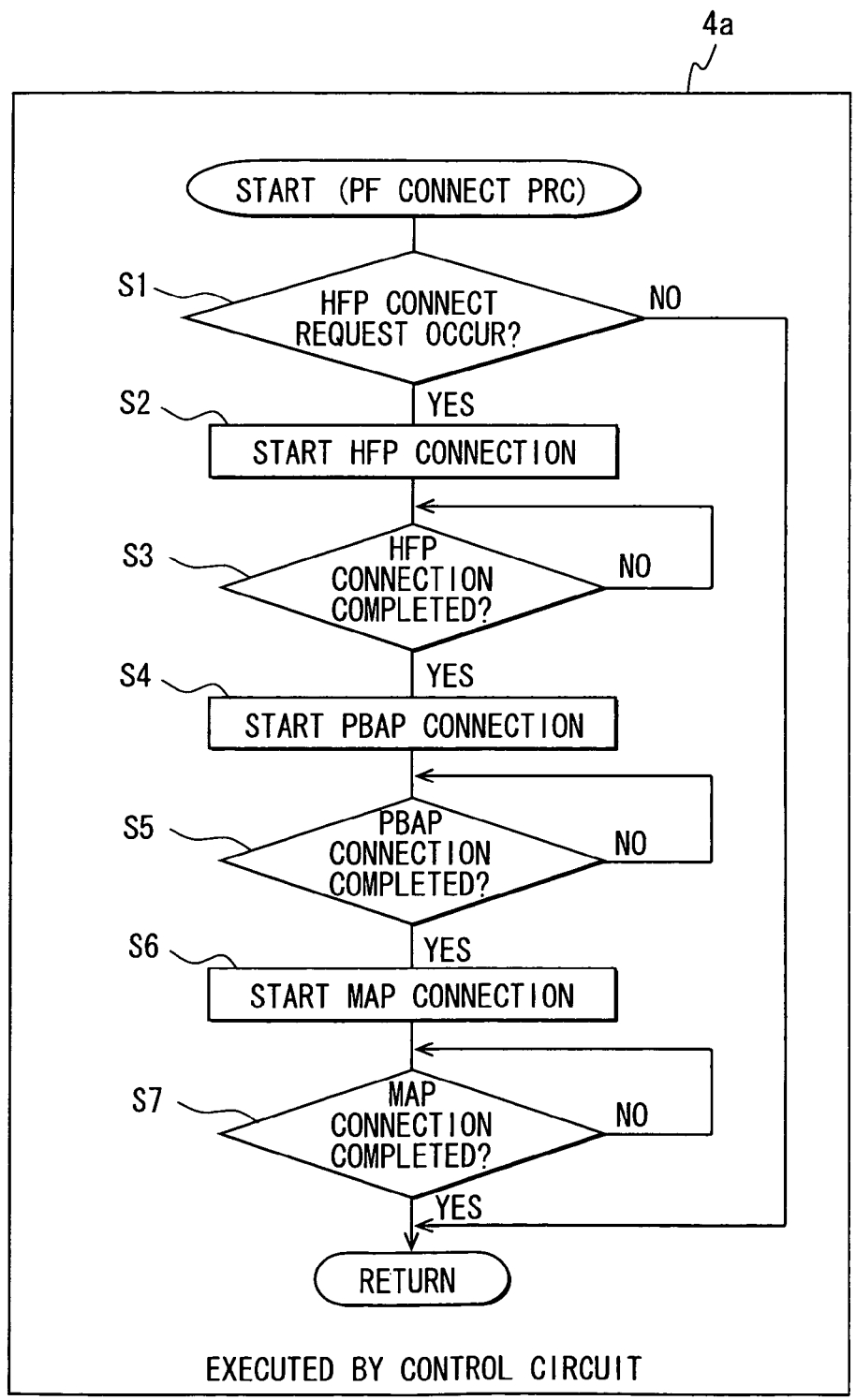
FIG. 2 is a flowchart (part 1)
Figure 3:
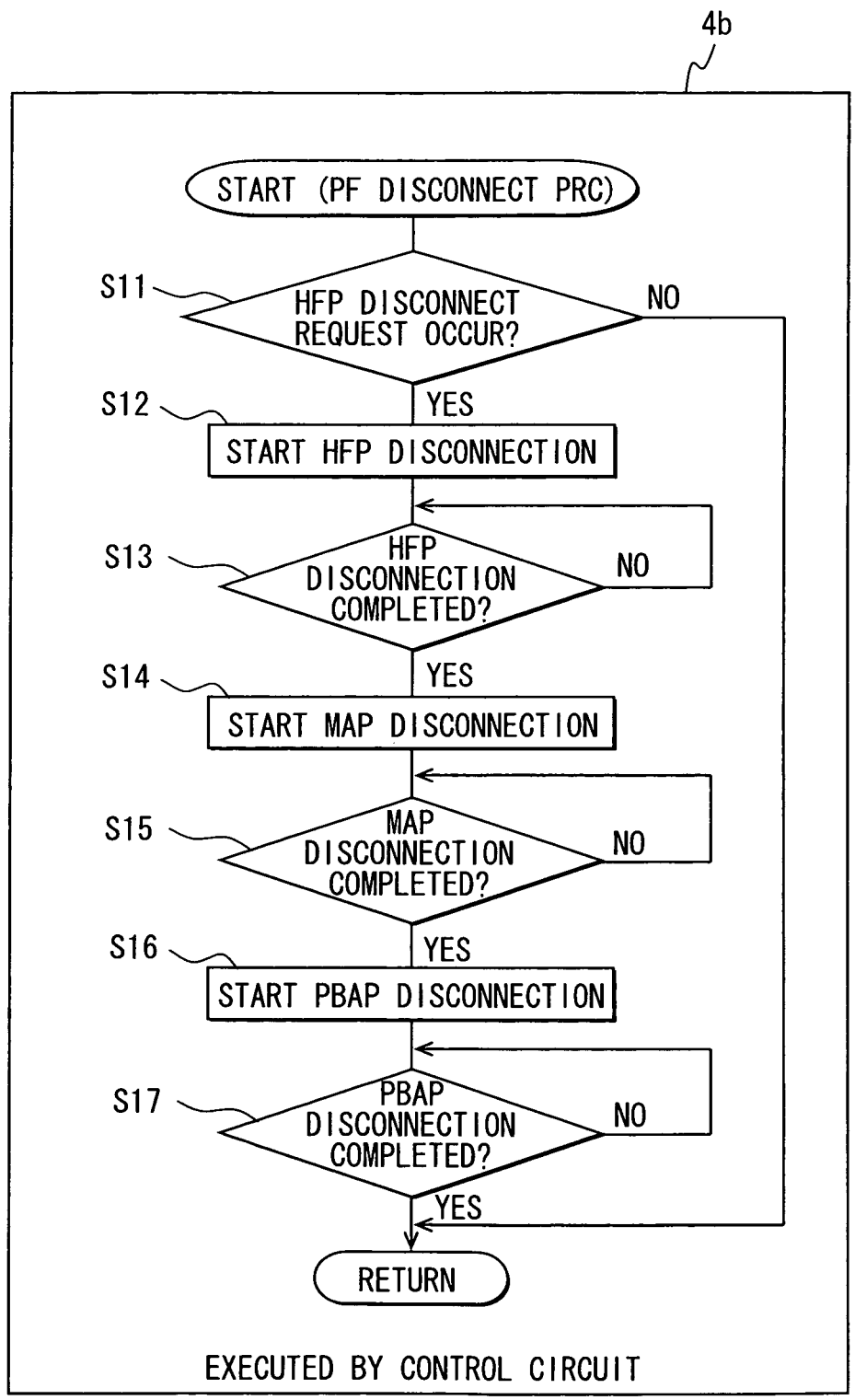
FIG. 3 is a flowchart (part 2)
Figure 4:
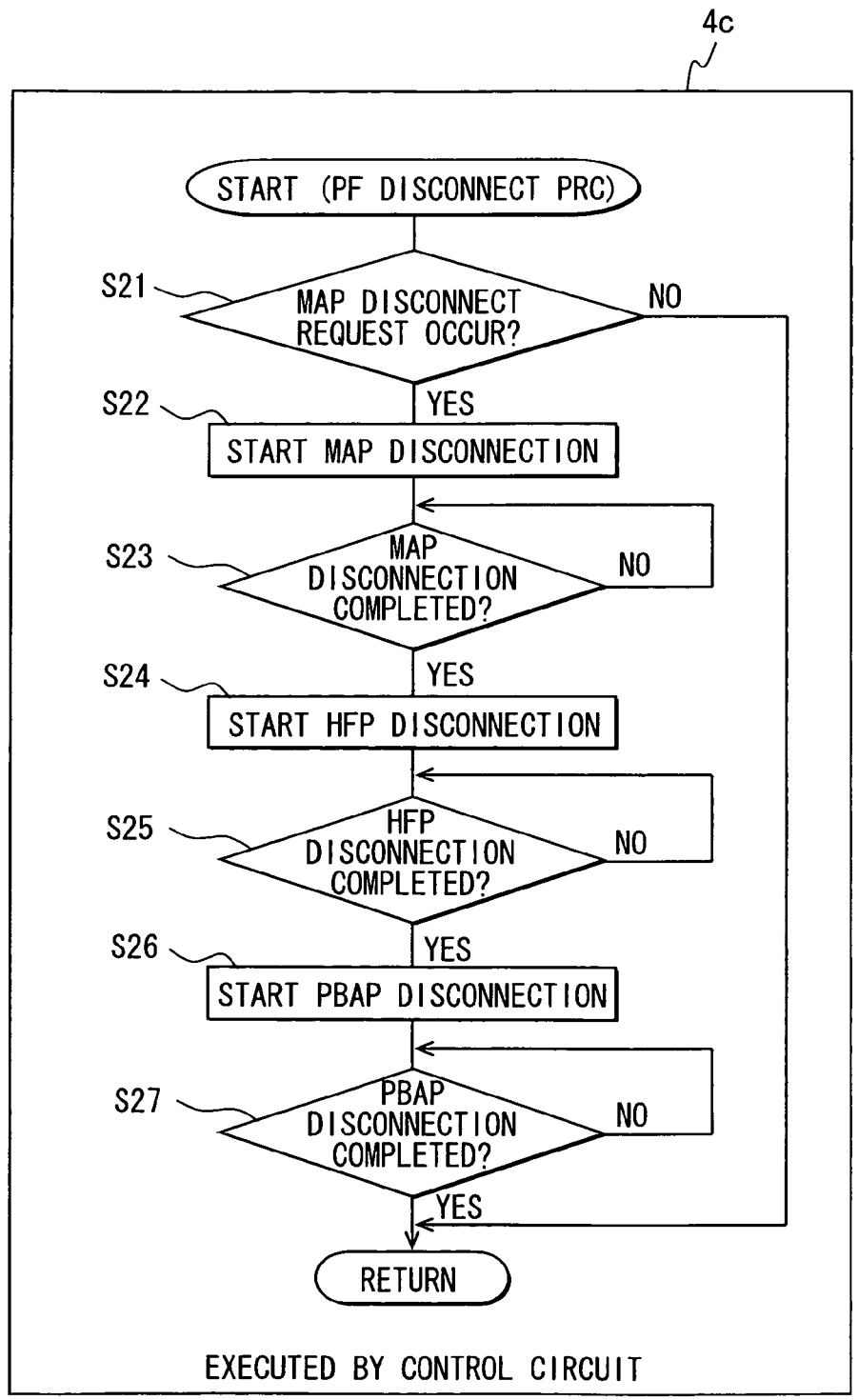
FIG. 4 is a flowchart (part 3).

An operation under the above configuration is explained with reference to FIGS. 2 and 4. FIG. 2 illustrates a profile connection process 4a executed by the control circuit 4 of the in-vehicle handsfree apparatus 2. In the profile connection process 4a, the in-vehicle handsfree apparatus 2 connects a profile with the cellular phone 3. FIGS. 3 and 4 illustrate profile disconnection processes 4b, 4c executed by the control circuit 4 of the in-vehicle handsfree apparatus 2. In the profile disconnection process 4b, 4c, the in-vehicle handsfree apparatus 2 disconnects profiles, which have been connected with the cellular phone 3. Hereinafter, the profile connection process 4a and the profile disconnection process 4b, 4c are explained in this order. The following explains the case that a concurrent connection with respect to HFP, PBAP, and MAP is to be established between the in-vehicle handsfree apparatus 2 and the cellular phone 3. It is further noted that a flowchart or the processing of the flowchart in the present application includes sections (also referred to as steps), which are represented, for instance, as S1. Further, each section can be divided into several sub-sections while several sections can be combined into a single section. Furthermore, each of thus configured sections can be referred to as a means or unit and achieved not only as a software device but also as a hardware device.

(1) Profile Connection Process

In the in-vehicle handsfree apparatus 2, the control circuit 4 starts the profile connection process 4a. At S1, it is determined whether a connection request of HFP (registry request of HFP) occurred. When the control circuit 4 determines that the connection request of HFP does not occur (corresponding to "NO" at S1), the profile disconnection process is completed. The processing then returns to another process (for example, main process).

It is noted that the control circuit 4 determines, for example, that the connection request of HFP is received via the touch operation device 17 when a user presses a predetermined touch key in an HFP registration window (unshown) in the display device 16. When it is determined that the HFP connection request occurred ("YES" at S1), an HFP connection process is started at S2, the HFP connection process connecting HFP between BT interface device 5 and the cellular phone 3.

In detail, when the control circuit 4 determines that the HFP connection request occurred, it is notified to the cellular phone 3 that the HFP connection request occurred. When the control circuit 4 determines that the BT interface device 5 receives "PIN request" transmitted from the cellular phone 3, the control circuit 4 transmits the "PIN response request" to the cellular phone 3 via the BT interface device 5, and waits the user's input of the PIN via the cellular phone 3. When the control circuit 4 determines that the BT interface device 5 received from the cellular phone 3 "PIN response," "link key," and "authentication result," which are transmitted based on the user's input of the PIN via the cellular phone 3, the control circuit 4 starts a process to register HFP with respect to the cellular phone 3 such that the HFP is associated with identification information (for example, telephone number) for identifying the cellular phone 3.

The control circuit 4 stands by the completion of the HFP connection process at S3. When the process is completed which registers HFP with respect to the cellular phone 3, and it is determined that the HFP connection process is completed ("YES" at S3), the notice window of the HFP connection completion is displayed in the display device 16. It is notified to the user that the connection process of HFP was completed.

Subsequently, the control circuit 4 causes the BT interface device 5 to transmit to the cellular phone 3 "function confirmation request" which asks a profile with which the cellular phone 3 is compliant. When the control circuit 4 receives "function response" transmitted from the cellular phone 3 via the BT interface device 5 and determines that the cellular phone 3 is compliant with PBAP and MAP as well as HFP, a PBAP connection process is started at S4 to connect PBAP between the BT interface device 5 and the cellular phone 3. The process is started to register PBAP with respect to the cellular phone 3.

The control circuit 4 stands by the completion of the PBAP connection process at S5. When the process is completed which registers PBAP with respect to the cellular phone 3, and it is determined that the PBAP connection process is completed ("YES" at S5), the notice window of the PBAP connection completion is displayed in the display device 16. It is notified to the user that the connection process of PBAP was completed.

Subsequently, the control circuit 4 displays in the display device 16 an MAP registration window (not shown) which asks about the connection request of MAP (registry request of MAP function). It is noted that the control circuit 4 determines, for example, that the connection request of MAP is received via the touch operation device 17 when a user presses a predetermined touch key in the MAP registration window (unshown) in the display device 16. The MAP connection process is started at S6, the MAP connection process connecting MAP between the BT interface device 5 and the cellular phone 3.

For example, when the control circuit 4 determines that the connection request of MAP was received via the touch operation device 17 based on the user's operation of pressing a predetermined key, the control circuit 4 transmits the "PIN response request" to the cellular phone 3 via the BT interface device 5, and waits for the user's input of the PIN via the cellular phone 3. When the control circuit 4 determines that the BT interface device 5 received from the cellular phone 3 "PIN response," which is issued based on the user's input of the PIN via the cellular phone 3, the connection process of MAP is started and the process to register MAP with respect to the cellular phone 3 is started.

The control circuit 4 stands by the completion of the MAP connection process at S7. When the process is completed which registers MAP with respect to the cellular phone 3, and it is determined that the MAP connection process is completed ("YES" at S7), the notice window of the MAP connection completion is displayed in the display device 16. It is notified to the user that the connection process of MAP was completed.

According to the series of process explained above, when HFP, PBAP, and MAP are connected between the BT interface device 5 and the cellular phone 3, those profiles are connected in this order of HFP, PBAP, and MAP. It is noted that the control circuit 4 sets up a condition for canceling the standby of the connection process of the respective profiles (for example, the standby time reaches a predetermined set time point). When the condition is satisfied during the duration of standing by the connection process of each profile, the standby of connection process of each profile is canceled (stopped). The processing thereby advances to another process.

(2) Profile Disconnection Process

In the in-vehicle handsfree apparatus 2, the control circuit 4 starts the profile disconnection process 4b. At S11, it is determined whether a disconnection request of HFP (or an HFP disconnection request) occurred. When the control circuit 4 determines that the disconnection request of HFP does not occur (corresponding to "NO" at S11), the profile disconnection process is completed. The processing then returns to another process (for example, main process).

It is noted that the control circuit 4 determines, for example, that the disconnection request of HFP (or registration cancellation request of HFP) is received via the touch operation device 17 when a user presses a predetermined touch key in an HFP registration cancellation window (unshown) in the display device 16. When it is determined that the HFP disconnection request occurred ("YES" at S11), an HFP disconnection process is started at S12, the HFP disconnection process disconnecting HFP between the BT interface device 5 and the cellular phone 3. The control circuit 4 stands by the completion of the disconnection process of HFP at S13.

Subsequently, the control circuit 4 cancels registration of HFP with respect to the cellular phone 3. When it is determined that the HFP disconnection process is completed ("YES" at S13), a MAP disconnection process, which disconnects MAP being currently connected between the BT interface device 5 and the cellular phone 3, is started at S14. The control circuit 4 stands by the completion of the disconnection process of MAP at S15. When the control circuit 4 cancels the registration of MAP with respect to the cellular phone 3 and determines that the disconnection process of MAP is completed ("YES" at S15), a PBAP disconnection process, which disconnects PBAP being currently connected between the BT interface device 5 and the cellular phone 3, is started at S16. The control circuit 4 stands by the completion of the disconnection process of PBAP at S17. When the control circuit 4 cancels the registration of PBAP with respect to the cellular phone 3 and determines that the disconnection process of PBAP is completed ("YES" at S17), the profile disconnection process 4b is thus completed. The processing then returns to another process.

According to the series of process explained above, when the control circuit 4 disconnects HFP, PBAP, and MAP, which are currently connected, between the BT interface device 5 and the cellular phone 3, those profiles are disconnected in the following order of HFP, MAP, and then PBAP, unlike the following order of HFP, PBAP, and then MAP, performed when those profiles are connected. It is noted that the control circuit 4 sets up a condition for canceling the standby of the disconnection process of the respective profiles (for example, the standby time reaches a predetermined set time point). When the condition is satisfied during the period of standing by the disconnection process of each profile, the standby of the disconnection process of each profile is canceled (stopped). The processing advances to another process.

In the above explanation, the disconnection process of HFP is executed, and then, the disconnection process of MAP is executed subsequently. In contrast, after the disconnection process of MAP is previously completed, the disconnection process of HFP can be then executed subsequently. Such a disconnection process 4c is illustrated in FIG. 4. That is, when the control circuit 4 determines that the MAP disconnection request occurred ("YES" at S21), the MAP disconnection process, which disconnects MAP being currently connected between the BT interface device 5 and the cellular phone 3, is started at S22. When it is determined that the MAP disconnection process is completed ("YES" at S23), the HFP disconnection process, which disconnects HFP being currently connected between the BT interface device 5 and the cellular phone 3, is started at S24. When it is determined that the HFP connection process is completed ("YES" at S25), a PBAP disconnection process, which disconnects MAP being currently connected between the BT interface device 5 and the cellular phone 3, is started at S26. When it is determined that the PBAP disconnection process is completed ("YES" at S27), the profile disconnection process 4c is thus completed. The processing then returns to another process.

As the explained above, the in-vehicle apparatus 2 according to the present embodiment is provided as follows. When establishing the concurrent connection with respect to not only HFP and PBAP but also MAP, the connection process of PBAP is started, without inserting the connection process of MAP, after the completion of the connection process of HFP. Under such a configuration, the duration from the completion of the connection process of HFP to the completion of the connection process of PBAP can be shortened as much as possible. The newest phone book data registered in the cellular phone 3 can be properly reflected in the in-vehicle handsfree apparatus 2. The usability can be thereby enhanced.

Moreover, when disconnecting HFP, PBAP, and MAP, all of which are being currently concurrently connected with the cellular phones 3, the disconnection process of MAP is started, without inserting the disconnection process of PBAP, after the completing of the disconnection process of HFP, or the disconnection process of HFP is started, without inserting the disconnection process of PBAP, after the completing of the disconnection process of MAP. Such a configuration suppresses as much as possible the state where one of HFP and MAP is connected and the other is disconnected, and helps prevent as much as possible the state where the apparatus of notifying an arrival of an incoming voice call and the apparatus of notifying an arrival of an incoming mail are different from each other. Furthermore, the above configuration can help prevent the state where the cellular phone 3 undesirably notifies the user of the arrival of the transmission, which arrives at the cellular phone from the communications network 18. The usability can be thereby enhanced.

The present invention is not limited only to the above-mentioned embodiment, and can be modified or extended as follows. The function of the in-vehicle handsfree apparatus 2 may be included in another in-vehicle apparatus, such as an in-vehicle navigation apparatus. HFP is connected between the BT interface device and the cellular phone; "function confirmation request" is then transmitted to the cellular phone; "function response" is transmitted from the cellular phone and the in-vehicle handsfree apparatus receives "function response"; and it is thereby determined that the cellular phone 3 is compliant with PBAP and MAP as well as HFP. Without need of being limited to the above, another procedure can be adopted. That is, without causing the cellular phone to transmit "function confirmation request," the cellular phone voluntarily transmits "function response" and the in-vehicle handsfree apparatus thereby receives "function response"; and it is determined that the cellular phone 3 is compliant with PBAP and MAP as well as HFP.

The configuration is necessary where the connection process of PBAP is started, without inserting the connection process of MAP, after the completing of the connection process of HFP. Thus, after the completion of the connection processing of PBAP, any order or procedure can be adopted to connect a profile. The configuration is necessary where the disconnection process of MAP is started, without inserting the disconnection process of any profile, after the completing of the disconnection process of HFP. Thus, after completing the disconnection process of MAP, any order or procedure can be adopted to disconnect a profile. The configuration is necessary where the disconnection process of HFP is started, without inserting the disconnection process of any profile, after the completing of the disconnection process of MAP. That is, after completing the disconnection process of HFP, any order or procedure can be adopted to disconnect a profile. That is, as long as the disconnection processes are directly succeeded by each other with respect to the profiles which notify arrivals of transmissions coming to the cellular phone from the communications network, the disconnection process of any other profile can be made in any order or procedure.

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, an in-vehicle apparatus having a handsfree function for a vehicle is provided as follows. Connecting means is configured for connecting several communications protocols simultaneously with a cellular phone to establish concurrent connection. Herein, the several communications protocols include at least a handsfree phone call protocol for realizing a handsfree phone call and a phone book data transfer protocol for realizing transfer of phone book data from the cellular phone to the in-vehicle apparatus. Controlling means is configured for controlling connection and disconnection of a communications protocol between the connecting means and the cellular phone. Herein, the controlling means is further configured to start a connection process of the phone book data transfer protocol, without inserting a connection process of an other communications protocol except the phone book data transfer protocol, after completing a connection process of the handsfree phone call protocol, when the concurrent connection with the cellular phone is established by the connecting means with respect to the several communications protocols at least including the handsfree phone call protocol and the phone book data transfer protocol.

Such a configuration can thereby shorten as much as possible a duration from when a connection process of the handsfree phone call protocol is completed to when a connection process of the phone book data transfer protocol is started. The newest phone book data registered in the cellular phone can be thereby appropriately reflected on the in-vehicle handsfree apparatus, thereby improving the user's operability.

As an optional aspect of the in-vehicle apparatus, the connecting means may be further configured to connect a mail transfer protocol for realizing an electronic mail transfer from the cellular phone to the in-vehicle apparatus' to establish the concurrent connection with respect to the several communications protocols at least including the mail transfer protocol as well as the handsfree phone call protocol and the phone book data transfer protocol. Herein, when the concurrent connection with the cellular phone is established between the connecting means and the cellular phone with respect to the several communications protocols at least including the handsfree phone call protocol, the phone book data transfer protocol, and the mail transfer protocol, the controlling means may be further configured, after completing a connection process of the handsfree phone call protocol, to start a connection process of the phone book data transfer protocol without inserting a connection process of an other communications protocol except the phone book data transfer protocol, and then start a connection process of the mail transfer protocol after completing the connection process of the phone book data transfer protocol.

Under such a configuration, after completing the connection process of the phone book data transfer protocol, the connection process of the mail transfer protocol is started. The application which forwards the e-mail from the cellular phone to the in-vehicle apparatus with the handsfree function can be therefore realized.

Furthermore, in the foregoing in-vehicle apparatus, when disconnecting the handsfree phone call protocol, the phone book data transfer protocol, and the mail transfer protocol, all of which are presently connected between the connecting means and the cellular phone under the concurrent connection, the controlling means may be further configured, after completing a disconnection process of the handsfree phone call protocol, to start a disconnection process of the mail transfer protocol without inserting a disconnection process of an other communications protocol except the mail transfer protocol, and then start a disconnection process of the phone book data transfer protocol after completing the disconnection process of the mail transfer protocol.

Such a configuration can help prevent as much as possible, the state where one of the handsfree phone call protocol and the mail transfer protocol is connected while the other is disconnected. Moreover, the above configuration can help prevent the state where the apparatuses of notifying arrivals of transmissions are differentiated depending on the types of the transmissions. Furthermore, the above configuration can help prevent the state where the cellular phone undesirably notifies the user of the arrival of the transmission, which arrives at the cellular phone from the communications network. The usability can be thereby enhanced.

Yet furthermore, in the above in-vehicle apparatus, when disconnecting the handsfree phone call protocol, the phone book data transfer protocol, and the mail transfer protocol, all of which are presently connected between the connecting means and the cellular phone under the concurrent connection, the controlling means may be further configured, after completing a disconnection process of the mail transfer protocol, to start a disconnection process of the handsfree phone call protocol without inserting a disconnection process of an other communications protocol except the handsfree phone call protocol, and then start a disconnection process of the phone book data transfer protocol after completing the disconnection process of the handsfree phone call protocol.

Under such a configuration, similarly to the configuration previously mentioned before, the state where one of the handsfree telephone call protocol and the mail transfer protocol is connected while the other is disconnected can be prevented as much as possible. Moreover, the above configuration can help prevent the state where the apparatuses of notifying arrivals of transmissions are differentiated depending on the types of the transmissions. Furthermore, the above configuration can help prevent the state where the cellular phone undesirably notifies the user of the arrival of the transmission, which arrives at the cellular phone from the communications network. The usability can be thereby enhanced.

It will be obvious to those skilled in the art that various changes may be made in the above-described embodiments of the present invention. However, the scope of the present invention should be determined by the following claims.

What is claimed:

1. An in-vehicle apparatus having a handsfree function for a vehicle, the in-vehicle apparatus comprising:
   means for connecting several communications protocols with a cellular phone to establish concurrent connection, the several communications protocols at least including (i) a handsfree phone call protocol for realizing a handsfree phone call, (ii) a phone book data transfer protocol for realizing transfer of phone book data from the cellular phone to the in-vehicle apparatus, and (iii) a mail transfer protocol for realizing an electronic mail transfer from the cellular phone to the in-vehicle apparatus; and
   means for controlling connection and disconnection of the communications protocols between the connecting means and the cellular phone,
   the controlling means being further configured to
   start a connection process of the handsfree phone call protocol,
   after completing the connection process of the handsfree phone call protocol, start a connection process of the phone book data transfer protocol without starting a connection process of an other communications protocol except the phone book data transfer protocol, and
   after completing the connection process of the phone book data transfer protocol, start a connection process of the mail transfer protocol,
   in cases that the connection with the cellular phone is established by the connecting means with respect to the several communications protocols.

2. An in-vehicle apparatus having a handsfree function for a vehicle, the in-vehicle apparatus comprising:
   means for connecting several communications protocols with a cellular phone to establish concurrent connection, the several communications protocols at least including (i) a handsfree phone call protocol for realizing a handsfree phone call, (ii) a phone book data transfer protocol for realizing transfer of phone book data from the cellular phone to the in-vehicle apparatus, and (iii) a mail transfer protocol for realizing an electronic mail transfer from the cellular phone to the in-vehicle apparatus; and
   means for controlling connection and disconnection of the communications protocols between the connecting means and the cellular phone,
   the controlling means being further configured to
      start a connection process of the handsfree phone call protocol,
      then start a connection process of the phone book data transfer protocol, and
      then start a connection process of the mail transfer protocol,
   in cases that the connection with the cellular phone is established by the connecting means with respect to the several communications protocols, wherein
   when disconnecting the handsfree phone call protocol, the phone book data transfer protocol, and the mail transfer protocol, all of which are presently connected between the connecting means and the cellular phone under the concurrent connection,
   the controlling means is further configured to start a disconnection process of the mail transfer protocol and then start a disconnection process of the phone book data transfer protocol after completing the disconnection process of the mail transfer protocol.

3. An in-vehicle apparatus having a handsfree function for a vehicle, the in-vehicle apparatus comprising:
   means for connecting several communications protocols with a cellular phone to establish concurrent connection, the several communications protocols at least including (i) a handsfree phone call protocol for realizing a handsfree phone call, (ii) a phone book data transfer protocol for realizing transfer of phone book data from the cellular phone to the in-vehicle apparatus, and (iii) a mail transfer protocol for realizing an electronic mail transfer from the cellular phone to the in-vehicle apparatus; and
   means for controlling connection and disconnection of a communications protocol between the connecting means and the cellular phone,
   the controlling means being further configured to
      start a connection process of the handsfree phone call protocol,
      then start a connection process of the phone book data transfer protocol without starting a connection process of an other communications protocol except the phone book data transfer protocol, and
      then start a connection process of the mail transfer protocol,
   in cases that the connection with the cellular phone is established by the connecting means with respect to the several communications protocols, wherein
   when disconnecting the handsfree phone call protocol, the phone book data transfer protocol, and the mail transfer protocol, all of which are presently connected between the connecting means and the cellular phone under the concurrent connection,
   the controlling means is further configured, to start a disconnection process of the handsfree phone call protocol and then start a disconnection process of the phone book data transfer protocol after completing the disconnection process of the handsfree phone call protocol.

4. A method for connecting several communications protocols to establish a concurrent connection with a cellular phone by an in-vehicle apparatus, the several communications protocols including i), a handsfree phone call protocol for realizing a handsfree phone call, (ii) a phone book data transfer protocol for realizing transfer of phone book data from the cellular phone to the in-vehicle apparatus, and (iii) a mail transfer protocol for realizing an electronic mail transfer from the cellular phone to the in-vehicle apparatus,
   the method comprising:
   starting a connection process of the handsfree phone call protocol first when establishing the concurrent connection between the in-vehicle apparatus and the cellular phone with respect to the several communications protocols;
   then determining whether the connection process of the handsfree phone call protocol with the cellular phone is completed;

starting a connection process of the phone book data transfer protocol immediately after determining that the connection process of the handsfree phone call protocol is completed, without starting a connection process of an other communications protocol except the phone book data transfer protocol, then determining whether the connection process of the phone book data transfer protocol with the cellular phone is completed; and starting a connection process of the mail transfer protocol immediately after determining that the connection process of the phone book data transfer protocol is completed.

\* \* \* \* \*